(12) United States Patent
Kotrla et al.

(10) Patent No.: US 7,907,520 B2
(45) Date of Patent: Mar. 15, 2011

(54) PATH TESTING AND SWITCHING

(75) Inventors: Scott R. Kotrla, Wylie, TX (US); Christopher N. Del Regno, Rowlett, TX (US); Matthew W. Turlington, Richardson, TX (US); Michael U. Bencheck, Richardson, TX (US); Richard C Schell, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 519 days.

(21) Appl. No.: 11/862,418

(22) Filed: Sep. 27, 2007

(65) Prior Publication Data
US 2009/0086643 A1     Apr. 2, 2009

(51) Int. Cl.
*H04J 1/16* (2006.01)
*H04J 3/14* (2006.01)

(52) U.S. Cl. .......................... 370/229; 370/230; 370/231

(58) Field of Classification Search .................. 370/229, 370/230, 230.1, 231, 232, 233, 234, 235, 370/235.1, 236, 236.2, 237, 238, 238.1, 239, 370/240
See application file for complete search history.

(56) References Cited

U.S. PATENT DOCUMENTS

| | | | |
|---|---|---|---|
| 6,426,942 B1 | 7/2002 | Sienel et al. | |
| 6,529,499 B1 | 3/2003 | Doshi et al. | |
| 6,868,080 B1 | 3/2005 | Umansky et al. | |
| 6,937,622 B2 | 8/2005 | Gross | |
| 7,092,410 B2 * | 8/2006 | Bordonaro et al. | 370/516 |
| 7,209,447 B1 | 4/2007 | Marsh et al. | |
| 2002/0107040 A1 | 8/2002 | Crandall et al. | |
| 2005/0073961 A1 | 4/2005 | Paik et al. | |
| 2005/0213509 A1 * | 9/2005 | Collomb et al. | 370/252 |
| 2006/0050712 A1 * | 3/2006 | Allen | 370/395.2 |
| 2006/0140132 A1 | 6/2006 | Lee et al. | |

FOREIGN PATENT DOCUMENTS

| | | |
|---|---|---|
| GB | 2431317 | 4/2007 |
| WO | 01/65268 | 9/2001 |

OTHER PUBLICATIONS

"Ethernet Demarcation: Draw the Line, Demarc You Network", retrieved from www.ethernet-demarcation.com, whole document, copyright 2007.

* cited by examiner

*Primary Examiner* — Kwang B Yao
*Assistant Examiner* — Adam Duda

(57) ABSTRACT

A method may include forming a first path from a first node to a second node and transmitting data via the first path. The method also includes measuring a performance parameter associated with transmitting data via the first path and determining whether the measured performance parameter meet a required performance parameter. The method also includes sending a notification to a customer associated with the first path when the measured performance parameter does not meet the required performance parameter, where the notification indicates that the first path is unavailable.

19 Claims, 5 Drawing Sheets

PATH TESTING AND SWITCHING

BACKGROUND INFORMATION

Routing data in a network has become increasingly complex due to increased overall traffic and customer bandwidth requirements. As a result, network devices often experience congestion related problems, such as latency problems, and may also fail. Links connecting various network devices may also experience problems and/or fail.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention. Instead, the scope of the invention is defined by the appended claims and their equivalents.

Implementations described herein relate to network communications and path switching. When a primary path associated with routing a customer's data experiences problems, such as latency-related problems, the customer may be notified that the path does not satisfy the customer's particular requirements. In some implementations, traffic may be rerouted on an alternate path that satisfies the customer's particular requirements.

Figure 1:
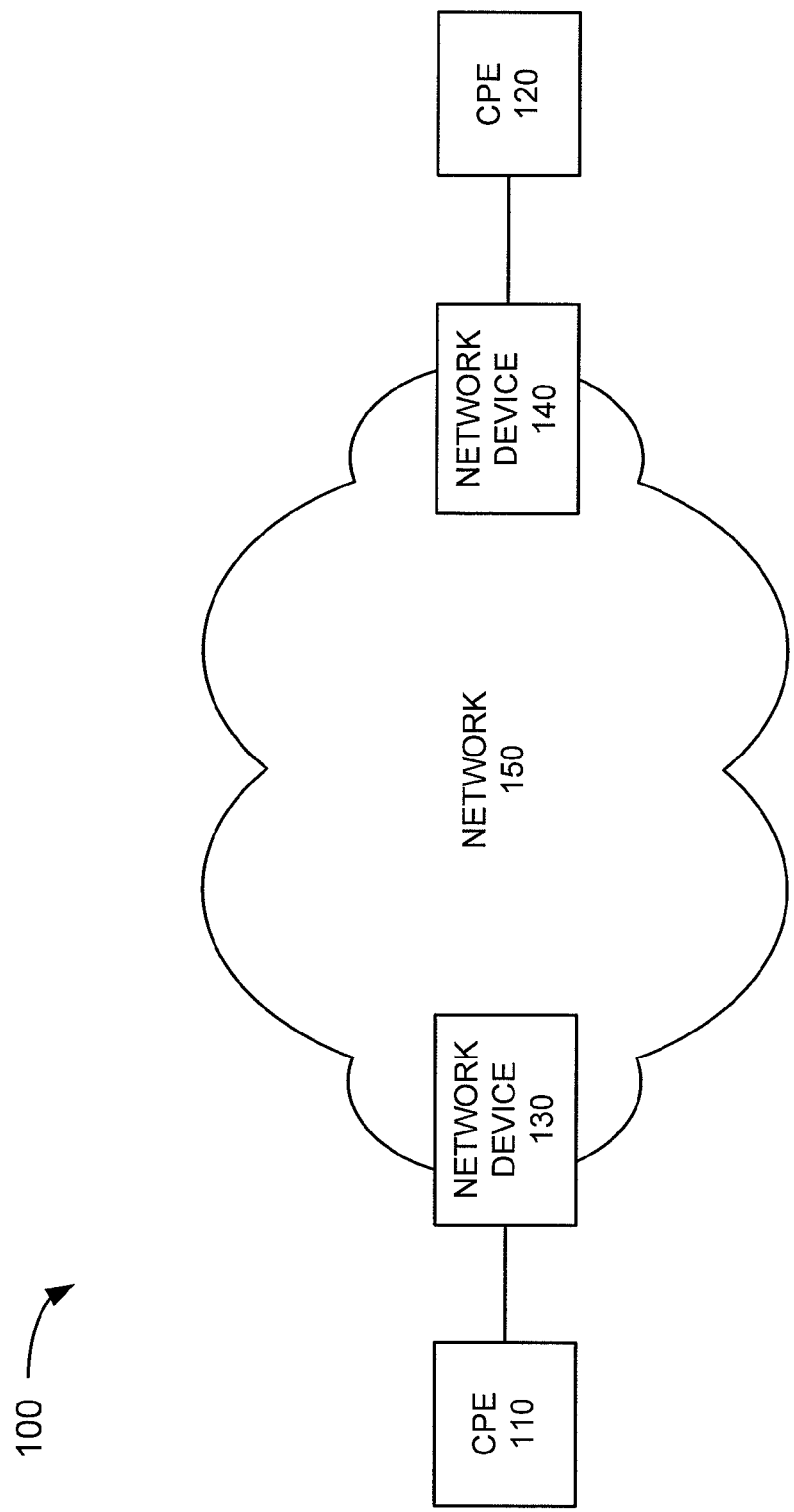
FIG. 1 illustrates an exemplary network in which systems and methods described herein may be implemented.

FIG. 1 is a block diagram of an exemplary network 100 in which systems and methods described herein may be implemented. Network 100 may include customer premises equipment (CPE) 110, CPE 120, network device 130, network device 140 and network 150. The number of elements illustrated in FIG. 1 is provided for simplicity. It should be understood that network 100 may include additional elements, such as additional CPE components and/or network devices.

CPE 110 and 120 may represent any customer provided equipment, such as time division multiplexed (TDM) circuits, a telephone system (e.g., a private branch exchange (PBX), a voice over Internet protocol (VoIP) system), one or more computers, one or more servers, one or more switches, one or more routers, a network, such as a local area network (LAN) or wide area network (WAN) associated with a customer, or other devices/systems associated with a customer. CPE 110 and CPE 120 may transmit data to and receive data from a network, such as network 150, via any number of protocols, such as Ethernet, Frame Relay, asynchronous transfer mode (ATM), time division multiplexing (TDM), Internet protocol (IP), etc.

CPE 110 and CPE 120 may be associated with the same customer or different customers. For example, CPE 110 and CPE 120 may represent origination and destination devices associated with a dedicated private communication service between CPE 110 and CPE 120 that may be provided by a service provider associated with network devices 130/140 and/or network 150. Alternatively, CPE 110 and CPE 120 may represent different entities/customers that are provided with shared or dedicated communication services provided by a service provider associated with network devices 130/140 and/or network 150.

Network devices 130 and 140 may include one or more devices used to measure latency, packet loss and/or jitter associated with data transmitted from CPE 110 to CPE 120, as described in detail below. In one implementation, network devices 130 and 140 may each represent a point of data aggregation. For example, network device 130 may be a Building Ethernet Aggregation System (BEAS) that aggregates Ethernet related customer traffic in a particular customer location (e.g., building, campus, etc.) associated with, for example, CPE 110. In this implementation, network device 130 may forward the aggregated customer traffic associated with CPE 110 via network 150 using Ethernet, Gigabit Ethernet, etc. In some implementations, network devices 130 and 140 may also encapsulate the received data in one or more plesiochronous circuits (e.g., DS1, DS3 circuits). Network devices 130 and 140 may also aggregate and forward data via other transport mechanisms/protocols, such as optical carrier level 3 (OC3), OC12, etc., based on the amount of data to be processed and the particular user requirements.

In other implementations, network devices 130 and 140 may each be located at a demarcation point, such as in an Ethernet demarcation (ED) device, network interconnection device (NID) or managed media converter.

In still other implementations, network devices 130 and 140 may each represent a switch, a router, a gateway, etc., that receives data and routes the data via network 150 to a destination device. In one exemplary implementation, network devices 130 and 140 may be provider edge (PE) devices that route data received from various devices, such as CPE 110 and 120, using multi-protocol label switching (MPLS). In this case, network devices 130 and 140 may set up a label switching path (LSP) via network 150 in which data forwarding decisions are made using an MPLS label included with a data packet to identify a next hop to which to forward the data. For example, devices in the LSP may receive a data packet that includes an MPLS label in the header of the data packet. The various hops in the LSP may then use the label to identify an output interface on which to forward the data packet without analyzing other portions of the header, such as a destination address.

In each case, network devices 130 and 140 include measurement logic that is able to measure latency, packet loss, jitter and/or other parameters associated with routing data via network 150. This measurement information may then be used to make path switching decisions, as described in detail below.

Network 150 may represent a network used to route customer traffic to/from various devices in network 100, such as CPE 110 and CPE 120. Network 150 may include a number of devices and links that may be used to connect network devices 130 and 140. In an exemplary implementation, network 150 may include a number of devices used to route data using multi-protocol label switching (MPLS). In this implementation, network devices 130 and 140 may represent a head end and tail end, respectively, of a label switching path (LSP). In another implementation, network 150 may represent a demarcation point in network 100 between conventional circuit switched components and packet switched components.

CPEs 110 and 120 and network devices 130 and 140 may connect to each other and network 150 via wired, wireless or optical communication mechanisms. For example, CPE 110 may connect to network device 130 via a layer 2 network (e.g., an Ethernet network), point-to-point links, the public switched telephone network (PSTN), a wireless network, the Internet, or some other mechanism.

The exemplary configuration illustrated in FIG. 1 is provided for simplicity. It should be understood that a typical network may include more or fewer devices than illustrated in FIG. 1. In addition, network device 130 is shown as a separate device from CPE 110 and network device 140 is shown as a separate device from CPE 120. In other implementations, the functions performed by network device 130 and CPE 110 may be performed by a single device or node. For example, CPE 110 may perform the testing and measuring functions of network device 130 described below. Similarly, the functions performed by network device 140 and CPE 120 may be performed by a single device or node.

Figure 2:
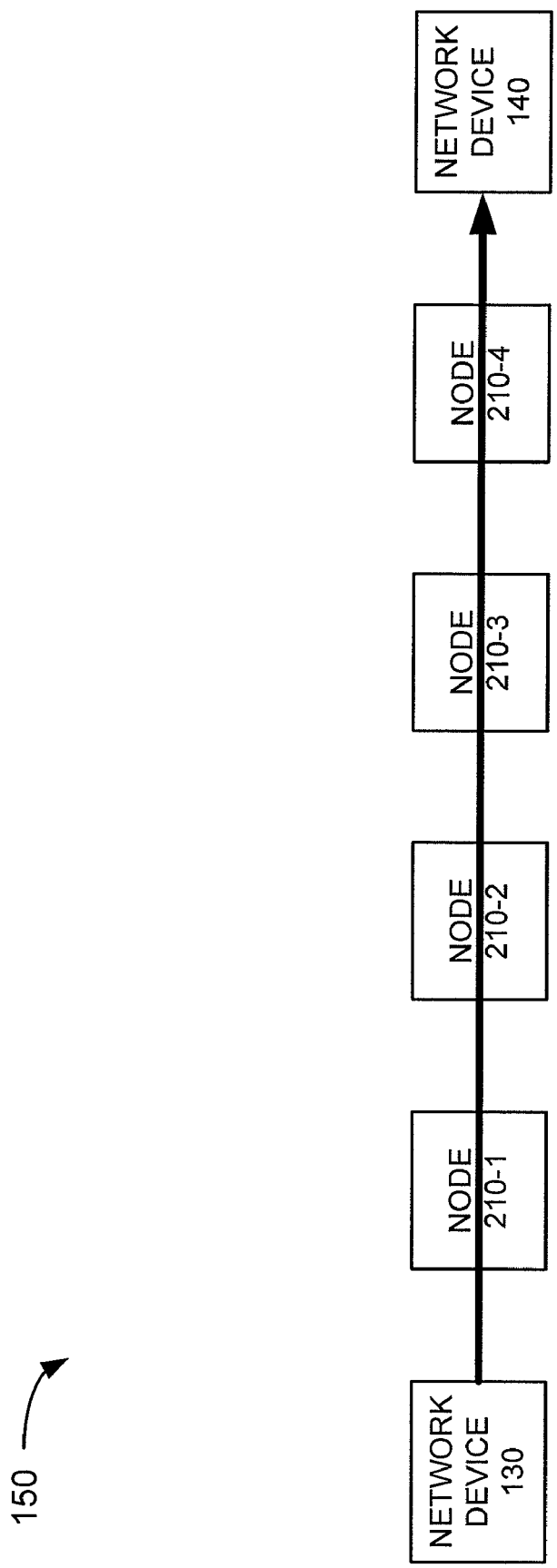
FIG. 2 illustrates an exemplary configuration of a portion of the network of FIG. 1.

FIG. 2 illustrates an exemplary configuration of a portion of network 150. Referring to FIG. 2, network 150 may include a number of nodes 210-1 through 210-4, referred to collectively as nodes 210.

Each of nodes 210 may include a switch, router, or another network device capable of routing data. In an exemplary implementation, nodes 210 may each represent a network device, such as a router, that is able to route data using, for example, MPLS. For example, in one implementation, network device 130 may represent the head end of an LSP to network device 140, which represents the tail end. In this implementation, the LSP from network device 130 to network device 140 may include nodes 210-1 through 210-4, as indicated by the line connecting network device 130 to network device 140 via nodes 210-1 through 210-4. Other paths and/or LSPs (not shown in FIG. 2) may also be set up to connect network device 130 to network device 140.

In an exemplary implementation, the path connecting network devices 130 and 140 may represent a circuit for a particular customer. In some implementations, if the path illustrated in FIG. 2 experiences congestion or delays in forwarding data via the path, network device 130 may stop routing data via the path, as opposed to allowing the path to be used with high latency or delay associated with routing the data. In this case, the customer associated with the path may effectively allow the path to experience down time, as opposed to routing data with higher than desired latency. In some implementations, network device 130 and/or network device 140 may also dynamically identify a new path in network 150 when the latency of an existing path exceeds a predetermined limit, as described in detail below.

Figure 3:
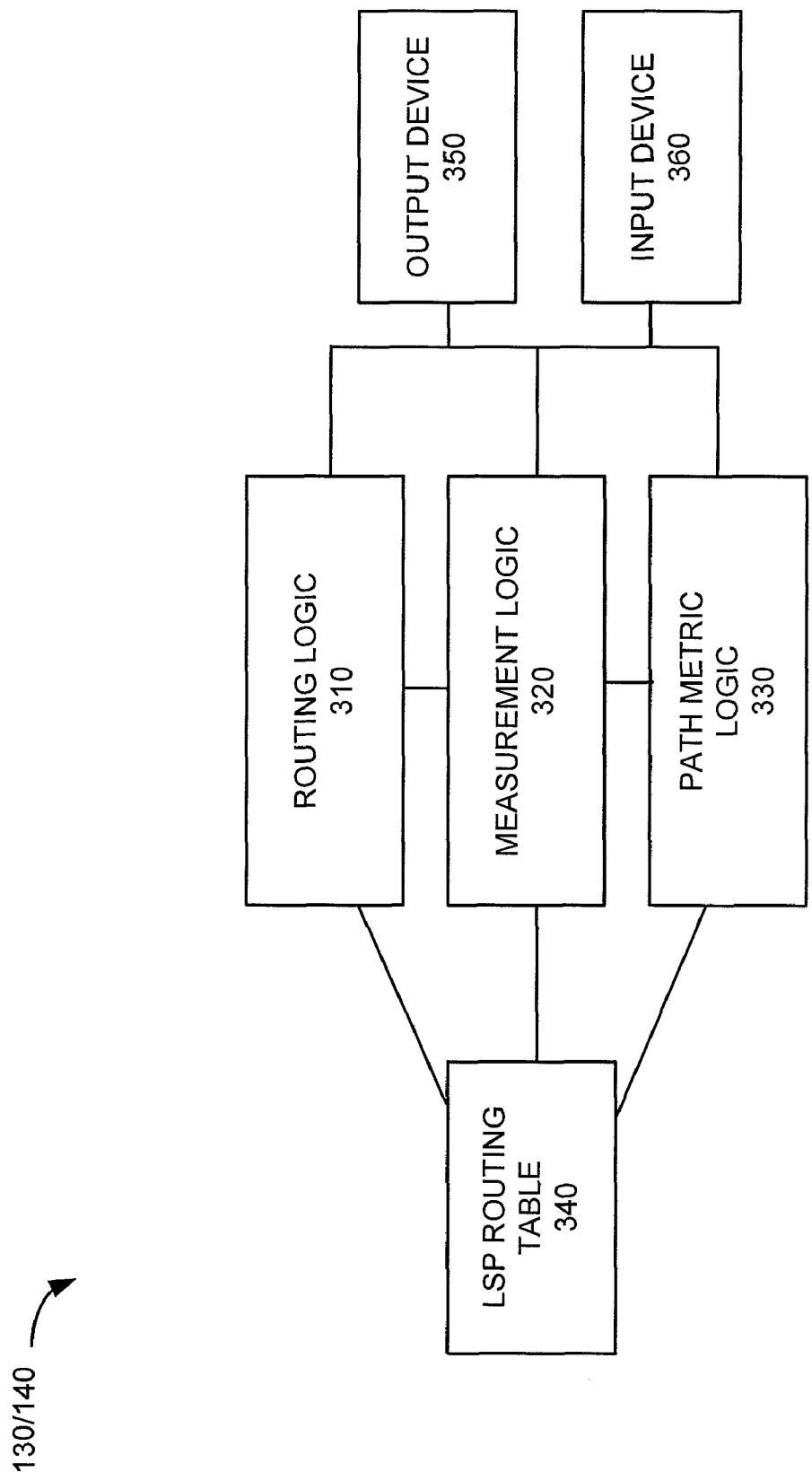
FIG. 3 illustrates an exemplary configuration of a network device of FIG. 1.

FIG. 3 illustrates an exemplary configuration of network device 130. Network device 140 may be configured in a similar manner. Referring to FIG. 3, network device 130 may include routing logic 310, measurement logic 320, path metric logic 330, LSP routing table 340, output device 350 and input device 360.

Routing logic 310 may include a processor, microprocessor, application specific integrated circuit (ASIC), field programmable gate array (FPGA) or another logic device or component that receives a data packet and identifies forwarding information for the data packet. In one implementation, routing logic 310 may identify an MPLS label associated with a data packet and identify a next hop for the data packet using the MPLS label.

Measurement logic 320 may include a processor, microprocessor, ASIC, FPGA or another logic device or component that is used to measure latency, packet loss and/or jitter associated with routing data via network 150. For example, measurement logic 320 within network device 130 may send test packets to network device 140 via output device 350. Measurement logic 320 within network device 140 may receive the test packets from network device 130 via input device 360 and determine an approximate latency associated with the path. The latency may correspond to the time associated with transmitting a packet from network device 130 to network device 140. Similar latency measurements may be performed based on a round trip delay time. For example, measurement logic 320 within network device 130 may send test packets to network device 140 via output device 350. Measurement logic 320 within network device 140 may receive the test packets from network device 130 via input device 360 and return the test packets to network device 130 via output device 350. Measurement logic 320 within network device 130 will receive the test packets from network device 140 via input device 360 and determine an approximate latency associated with the path for sending and receiving the test packets. Measurement logic 320 may also measure packet loss and/or jitter associated with transmitting data via network 150 using the transmitted and received test packets, as described in detail below.

Path metric logic 330 may include a processor, microprocessor, ASIC, FPGA or another logic device or component that identifies one or more alternate paths in network 150 that satisfy a particular metric. In an exemplary implementation, the metric may be a time or latency associated with transmitting data from CPE 110 to CPE 120. In an alternative implementation, the metric may be the cost associated with transmitting data packets from CPE 110 to CPE 120. The cost may be based on the bandwidth, distance and/or economics of data transmitted between CPE 110 and CPE 120. In each case, path metric logic 330 may identify an appropriate path based on the particular metric.

LSP routing table 340 may include routing information for LSPs that network device 130 forms with other devices in network 150. For example, in one implementation, LSP routing table 340 may include an incoming label field, an output interface field and an outgoing label field associated with a number of LSPs that include network device 130. In this case, routing logic 310 may access LSP routing table 340 to search for information corresponding to an incoming label to identify an output interface on which to forward the data packet along with an outgoing label to append to the data packet. Routing logic 310 may also communicate with path metric logic 330 to determine the appropriate LSP, if any, via which to forward the data packet.

Output device 350 may include one or more queues via which data packets will be output. In one implementation, output device 350 may include a number of queues associated with a number of different interfaces via which network device 130 may forward data packets.

Input device 360 may include one or more queues via which data packets will be input. In one implementation, input device 360 may include a number of queues associated with a number of different interfaces via which network device 130 may receive data packets.

Network device 130, as described briefly above, may determine latency, packet loss jitter and/or other parameters associated with forwarding data from CPE 110 to CPE 120. Network device 130 may also identify potential alternate paths via which data packets may be routed. The components in network device 130 may include software instructions contained in a computer-readable medium, such as a memory. A computer-readable medium may be defined as one or more memory devices and/or carrier waves. The software instructions may be read into memory from another computer-readable medium or from another device via a communication interface. The software instructions contained in memory may cause the various logic components to perform processes that will be described later. Alternatively, hardwired circuitry may be used in place of or in combination with software instructions to implement processes consistent with the principles of the invention. Thus, systems and methods described herein are not limited to any specific combination of hardware circuitry and software.

Figure 4:
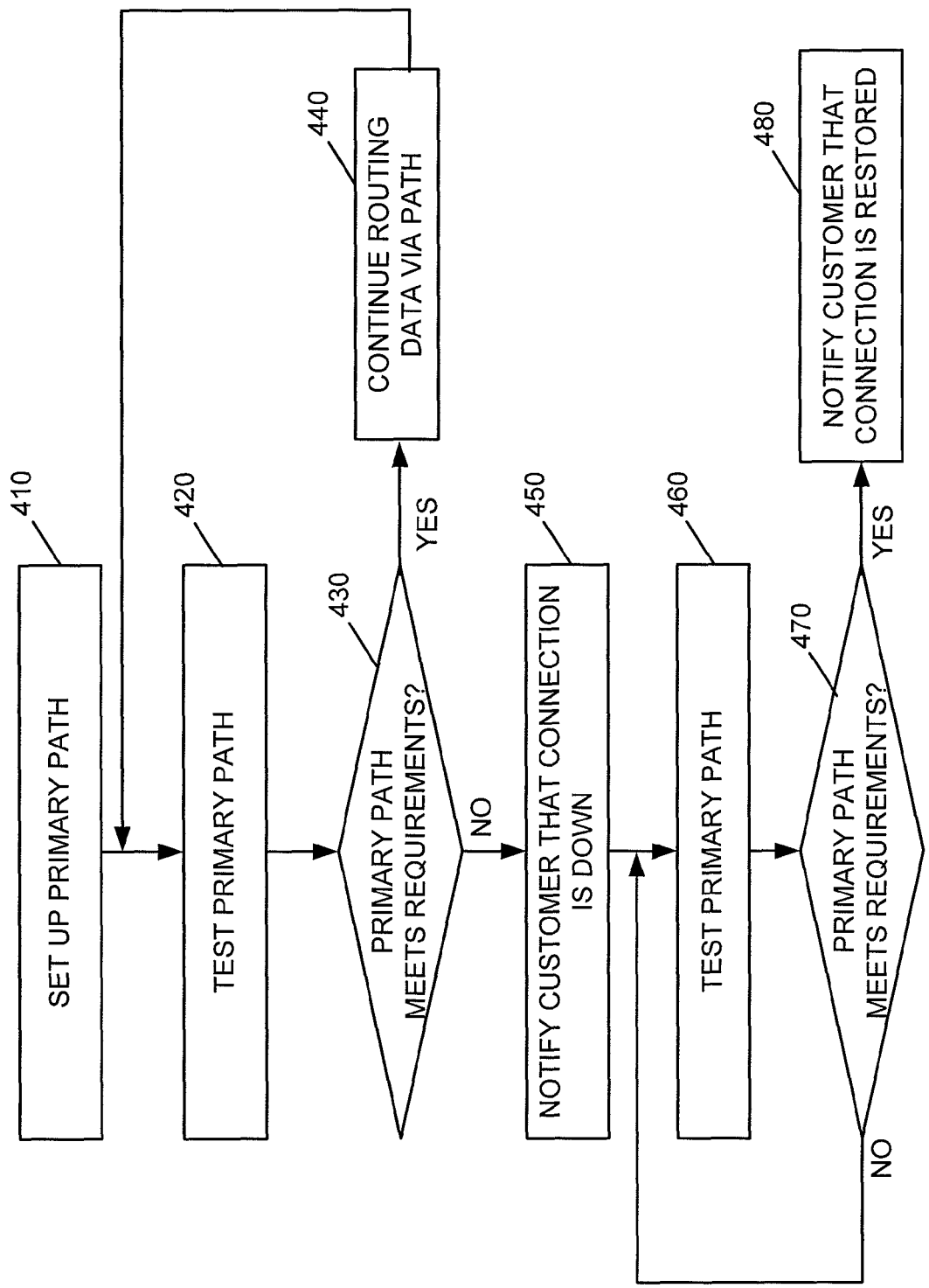
FIG. 4 is a flow diagram illustrating exemplary processing by various devices illustrated in FIG. 1.

FIG. 4 is a flow diagram illustrating exemplary processing associated with testing data paths in network 150. In this example, processing may begin with setting up a path for routing data in network 150 (act 410). In an exemplary implementation, assume that network device 130 wishes to set up an LSP with network device 140 via nodes 210 (FIG. 2). In this case, network device 130 may initiate setting up the LSP by sending a request to set up an LSP with network device 140 that includes label information identifying labels to be used in the LSP and also identifying the destination or tail end of the LSP (i.e., network device 140 in this example). The label information may then be forwarded hop by hop to the other nodes in the LSP. That is, node 210-1 may receive the request for setting up an LSP, store the label information in its memory (e.g., in an LSP routing table) and forward the request and label information to node 210-2, followed by node 210-2 forwarding the request to node 210-3, which forwards the request to node 210-4, which forwards the request to network device 140.

Figure 5:
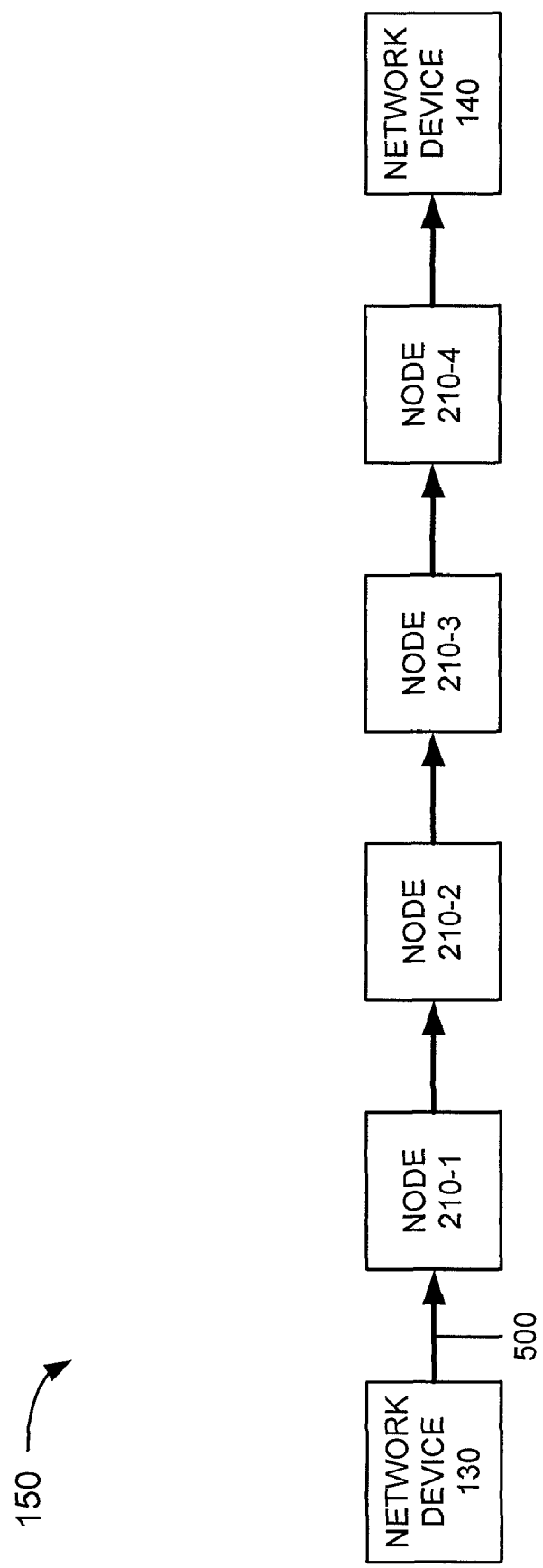
FIG. 5 illustrates the routing of data via a path in the portion of the network illustrated in FIG. 2.

Each of nodes 210 may store the label information in its respective memory, such as an LSP routing table similar to LSP routing table 340 described above. As discussed previously, LSP routing table 340 may include information identifying incoming labels, outgoing interfaces corresponding to the incoming labels and outgoing labels to append to the data packets forwarded to the next hops. After network device 140 receives the request and possibly forwards an acknowledgement back to network device 130, an LSP (the beginning hop of which is labeled 500 in FIG. 5 and referred to herein as path 500 or LSP 500) may be set up from network device 130 to network device 140. Thereafter, when a packet having an MPLS label is received by network device 130, routing logic 310 searches LSP routing table 340 for the label and identifies an outgoing interface on which to forward the packet. Routing logic 310 may also identify an outgoing label in LSP routing table 340 for the data packet and appends the outgoing label to the packet. The outgoing label will then be used by the next hop to identify data forwarding information.

Assume that a customer associated with CPE 110 has quality of service (QoS) requirements associated with transmitting data to CPE 120. Further assume that the QoS requirements include a latency requirement that indicates that a latency or delay associated with transmitting data from CPE 110 to CPE 120 be less than a predetermined time or value. Network device 130 may take real time measurements associated with data packets transmitted to CPE 120 to determine whether LSP 500 meets the customer's latency requirements (act 420).

For example, measurement logic 320 may send test traffic via output device 350 of network device 130 to measure the latency associated with LSP 500. Assume that the customer's latency requirement associated with transmitting data from CPE 110 to CPE 120 is a threshold of 20 milliseconds (ms). Measurement logic 320 may send test data including a predetermined number of packets to CPE 120 via LSP 500. In one implementation, network device 130 may send test data having a predetermined number of packets (e.g., having a predetermined frame size) to network device 140. It should be understood that in one implementation, network device 130 may be located at or very close to CPE 110 and network device 120 may be located at or very close to CPE 120. Therefore, measuring latency from network device 130 to network device 140 is equal to or very closely approximates the latency between CPE 110 and CPE 120. In alternative implementations, the functionality of network devices 130 and 140 may be integrated into CPEs 110 and 120, respectively.

In one exemplary implementation in which CPE 110 and network device 130 are part of the same device, CPE 110/network device 130 may send the test data via path 500 using an unused logical channel. For example, a customer may have data being routed in network 150 using one or more logical channels and may not be using another logical channel or may have another logical channel dedicated to measuring and testing various paths. In this case, measurement logic 320 may send the predetermined number of packets on network 150 using the unused/dedicated logical channel.

In each case, test data having a predetermined number of packets may be sent from network device 130 to network device 140 to measure latency, packet loss, jitter and/or other parameters. Network device 140 may include logic that identifies that particular data is test data and send the test data back to network device 130 via network 150. For example, the test data may include an identifier in the header indicating that the data is test data. Alternatively, network device 140 may determine that the data is test data based on an origination address (e.g., an IP address, a particular VLAN address, etc.) associated with the test data. In each case, network device 140 may loopback the test data to network device 130 via path 500. For example, network device 140 may automatically send the test data back to network device 130 while performing little to no processing on the test data. That is, network device 140 may identify the data as test data and send back the test data to network device 130, without requiring a processing unit at network device 140 to queue the data and/or formally respond by sending, for example, an acknowledgement message. Sending the test data back in this manner increases the accuracy associated with the measurements made by measurement logic 320 since the test data is not delayed at network device 140 and also reduces the processing load on network device 140.

Network device 130 may receive the returned test data and determine the latency associated with path 500. For example, measurement logic 320 may measure the amount of time from when the test data was sent by network device 130 until the time when the test data was received back at network device 130. This measurement may identify the round trip delay time from CPE 110 to CPE 120 and back to CPE 110. Measurement logic 320 may divide this round trip delay time by two to get an approximation of the latency associated transmitting data from CPE 110 to CPE 120. As previously described, in other implementations, a one way latency measurement may also be used.

Measurement logic 320 may then determine whether the latency is less than the customer's requirement (act 430). If the latency is less than the threshold value (e.g., 20 ms in this example), CPE 110 may continue to forward data to CPE 120 via path 500 (act 440).

In some implementations, network device 130 may send the test data at preset intervals and determine an average latency for a number of test packets. For example, measurement logic 320 may send five data frames having a predetermined packet size at a particular interval (e.g., every 1 second, 5 seconds, 1 minute, etc.) and determine the average latency for the five data frames. If the average latency is less than the threshold value (e.g., the average latency of the last five packets does not exceed 20 ms), CPE 110 may continue to forward data to CPE 120 via path 500 (act 440). Using an average latency over a predetermined number of intervals allows network device 130 to account for problems in network 150 that may only last for very short durations without requiring network device 130 to alert the customer to a problem and/or switch paths.

In some implementations, measurement logic 320 may also determine a packet loss associated with the test data (act 420). For example, measurement logic 320 may receive the looped back test data and determine whether any of the data packets were lost during transmission. Measurement logic 320 may then determine (at act 430) whether the number of packets lost (or percentage of packets lost) exceeds a predetermined value. For example, the predetermined limit may be two packets out of 100. In this case, measurement logic 320 may determine if more than two of the last 100 test packets have been lost. If the number of lost test packets does not exceed the threshold, network device 130 may continue to route data from CPE 110 to CPE 120 via path 500 (act 440).

In still other implementations, measurement logic 320 may also determine a packet jitter parameter associated with the test data (act 420). For example, the jitter parameter may measure variations or differences in arrival times between various packets. For example, assume that network device 130 receives the first looped back test packet at a first time, receives the second looped back test packet two milliseconds later and receives the third looped back test arrives one millisecond later. Measurement logic 320 may measure these variations in arrival times between packets and determine whether the difference exceeds a threshold (act 430). For example, the jitter value threshold may be set to 1.5 milliseconds. If the average jitter value does not exceed the threshold, network device 130 may continue to route data from CPE 110 to CPE 120 via path 500 (act 450).

In some implementations, any combination of latency, packet loss and jitter, as well as other parameters particular to the customer, may be used to determine whether path 500 meets the customer's requirements (e.g., the customer's QoS requirements). If the particular combination of parameters meets the customer's requirements (act 430—YES), network device 130 may continue to route data from CPE 110 to CPE 120 via path 500. Network device 130 may also continue to test path 500 over time to determine whether path 500 is meeting the predetermined requirements. The testing may be done at regular, predetermined intervals to ensure that path 500 is in compliance with the customer's QoS requirements.

Assume that measurement logic 320 determines that primary path 500 does not meet the customer's particular requirements, such as one or more of latency, packet loss and/or jitter requirements (act 430—NO). In this case, network device 130 may notify the customer associated with CPE 110 that the customer's connection from CPE 110 to CPE 120 is not available or is down (act 450).

For example, network device 130 may notify CPE 110 that the connection is down via an alarm message within the protocol being used. Alternatively, if multiple connections exist on a physical port, network device 130 may notify CPE 110 of the failure/problem on a logical channel (e.g., frame relay local management interface (LMI), metro Ethernet forum (MEF) LMI, Ethernet 802.1ag/ITU Y.1731). In still other cases, network device 130 may notify CPE 110 of the failure at the physical layer, such as by dropping the physical link or port connection to CPE 110.

In an exemplary implementation, once CPE 110 is notified or detects that the connection to CPE 120 is down, CPE 110 may switch to a backup connection. The backup connection may be provided via another service provider, or in some cases, by the same service provider.

Network device 130 may also continue to monitor the primary path (e.g., path 500) (act 460). Once network device 130 determines that path 500 is fully operational and meets the customer's requirements (act 470—YES), network device 130 may notify CPE 110, or an entity associated with CPE 110, that the primary path is restored (act 480). In an exemplary implementation, network device 130 may notify CPE 110 that the primary path from CPE 110 to CPE 120 is back up and operational in the same manner that it notified CPE 110 that the path was down. The customer may then decide whether to switch back to the original connection.

In the examples above, measurement logic 320 is described as measuring latency, packet loss and jitter. It should be understood that in other implementations, measurement logic 320 may be used to measure other metrics (e.g., cost) that may be associated with a customer's negotiated service level agreement (SLA) with a service provider. That is, the customer and the entity associated with network devices 130/140 and/or network 150 may have previously negotiated a guaranteed SLA regarding any number of parameters associated with routing data. In each case, measurement logic 320 may perform the desired testing to ensure that the link from CPE 110 to CPE 120 meets the parameters of the SLA. In addition, since network devices 130 and 140 may be deployed on a per customer basis, network devices 130/140 would be able to support separates sets of measurements for each particular customer, based on the particular customer's requirements.

Implementations described herein provide for routing data within a network while ensuring that the connection/path meets the customer's requirements. When the path does not meet the requirements, the customer may be notified.

The foregoing description of exemplary implementations provides illustration and description, but is not intended to be exhaustive or to limit the invention to the precise form disclosed. Modifications and variations are possible in light of the above teachings or may be acquired from practice of the invention.

For example, features have been described above with respect to determining whether a primary path meets customer requirements and notifying the customer when the primary path does not meet the customer's requirements. In other implementations, network device 130 may attempt to identify an alternative path that meets the customer's requirements path when the primary path does not meet the customer's requirements, as opposed to notifying the customer. In still other implementations, network device 130 may attempt to identify a path that may be performing at a higher level (e.g., having less latency, packet loss, jitter, etc.) than a primary path, even when the primary path is meeting the customer's requirements. In this case, network device 130 may compare the measured parameters (e.g., latency, packet loss, jitter, etc.) of the alternative path to the path currently being used and automatically switch to the higher performance path. Alternatively, the service provider associated with the primary and alternative paths may notify the customer of the higher performance path and allow the customer the option to switch to the higher performance path. In this manner, when a higher performance path is available, the customer's data may be routed via that higher performance path, as opposed to continuing to use a lower performance path. Network device 130 may continue to dynamically monitor the primary path and alternative paths in real time and dynamically identify the highest performance path. The primary path may then be automatically switched to the highest performance path or the customer may be given the option to switch paths. This may help improve performance (e.g., application performance) associated with the customer's traffic.

In addition, various features have been described above with respect to network device 130 identifying an LSP on which to route data. In other implementations, the path between network device 130 and network device 140 may not be an LSP. For example, a layer 2 connection/link between network devices 130 and 140 may be used to route the data. Alternatively, other types of links/connections, such as IP-based links/connections and/or TDM connections may be used to route the data.

Still further, features have been mainly described herein with respect to using test data to identify whether a primary path meets the customer's requirements. In other implementations, real network traffic may be monitored at network devices 130 and 140 to determine whether the primary path meets the customer's requirements. In such implementations, time tags may be included in the data packets transmitted from network device 130. Network device 140 may receive data packets from network device 130 with the time tags and determine the total transmission time for sending the data packets via the primary path.

In addition, while series of acts have been described with respect to FIG. 4, the order of the acts may be varied in other implementations. Moreover, non-dependent acts may be implemented in parallel.

It will be apparent to one of ordinary skill in the art that various features described above may be implemented in many different forms of software, firmware, and hardware in the implementations illustrated in the figures. The actual software code or specialized control hardware used to implement the various features is not limiting of the invention. Thus, the operation and behavior of the features of the invention were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as a processor, a microprocessor, an application specific integrated circuit, or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
forming a first path from a first node to a second node;
transmitting data via the first path;
measuring, at a first network device located at a head end of the first path, at least one performance parameter associated with transmitting data via the first path;
determining whether the measured at least one performance parameter meets a required performance parameter;
sending a first notification to a customer associated with the first path in response to determining that the measured at least one performance parameter does not meet the required performance parameter, the first notification indicating that the first path is unavailable;
detecting a recovery in the first path, the recovery indicating that the measured at least one performance parameter meets the required performance parameter; and
sending a second notification to the customer in response to detecting the recovery, the second notification indicating that the first path is available.

2. The method of claim 1, wherein the measuring comprises:
sending a plurality of test packets from the first network device to a second network device located at a tail end of the first path,
receiving, at the first network device, at least some of the plurality of test packets from the second network device,
measuring a round trip time for sending the test packets to the second network device and receiving the returned test packets, and
estimating a latency associated with the first path based on the round trip time.

3. The method of claim 2, wherein the measuring further comprises:
determining a packet loss value based on the returned test packets.

4. The method of claim 3, further comprising:
measuring a jitter value based on the returned test packets.

5. The method of claim 4, wherein the sending a first notification comprises:
sending the first notification to the customer when each of the estimated latency, packet loss value and jitter value do not meet requirements associated with latency, packet loss and jitter, respectively.

6. The method of claim 1, wherein the measuring comprises:
sending a plurality of test packets from the first network device to a second network device located at a tail end of the first path,
receiving, at the second network device, at least some of the plurality of test packets from the first network device,
measuring a time for sending the test packets from the first network device to the second network device, and
estimating a latency associated with the first path based on the time.

7. The method of claim 1, wherein the sending a first notification comprises:
sending the first notification to the customer in response to determining that a plurality of measured performance parameters do not meet a plurality of required performance parameters.

8. The method of claim 1, further comprising:
continuing to measure at least one of latency or packet loss associated with transmitting data via the first path; and
allowing the first path to remain in a down state when the first path does not meet the requirement.

9. The method of claim 1, further comprising:
identifying a second path in which the at least one performance parameter exceeds the measured at least one performance parameter associated with the first path.

10. The method of claim 9, further comprising:
sending a third notification to the customer in response to identifying the second path, the third notification indicating that a higher performance path is available for routing the customer's data.

11. The method of claim 9, further comprising:
automatically switching routing of the customer's data to the second path.

12. The method of claim 9, further comprising:
monitoring the first and second paths in real time; and identifying which of the first and second paths corresponds to a higher performance path.

13. The method of claim 12, further comprising:
automatically switching routing of the customer's data to the higher performance path.

14. A method, comprising:
routing data from a first network device to a second network device via a first path;
sending first test data via the first path at predetermined intervals;
receiving at least a portion of the first test data back from the second network device;
determining, using the received portion of the first test data, whether at least one performance parameter associated with the first path meets a threshold;
sending a first notification to a customer associated with the first path in response to determining that the at least one performance parameter does not meet the threshold, the notification indicating that the first path is unavailable;
detecting a recovery in the first path, the recovery indicating that the at least one performance parameter of the first path meets the threshold; and
sending a second notification to the customer in response to detecting the recovery, the second notification indicating that the first path is available.

15. A method, comprising:
routing data from a first network device to a second network device via a first path;
sending first test data via the first path at predetermined intervals;
receiving at least a portion of the first test data back from the second network device;
determining, using the received portion of the first test data, whether at least one performance parameter associated with the first path meets a threshold;
sending a first notification to a customer associated with the first path in response to determining that the at least one performance parameter does not meet the threshold, the notification indicating that the first path is unavailable, wherein the at least one performance parameter comprises packet loss, the method further comprising:
determining a packet loss value associated with the first path;
determining whether the packet loss value is less than a threshold packet loss value; and
stopping routing data via the first path when the packet loss value is not less than the threshold packet loss value.

16. A method, comprising:
routing data from a first network device to a second network device via a first path;
sending first test data via the first path at predetermined intervals;
receiving at least a portion of the first test data back from the second network device;
determining, using the received portion of the first test data, whether at least one performance parameter associated with the first path meets a threshold;
sending a first notification to a customer associated with the first path in response to determining that the at least one performance parameter does not meet the threshold, the notification indicating that the first path is unavailable, wherein the at least one performance parameter comprises latency variation, the method further comprising:
determining a variation in latency associated with the first path;
determining whether the variation in latency is less than a threshold latency variation value; and
stopping routing data via the first path when the variation in latency is not less than the threshold latency variation value.

17. A method, comprising:
routing data from a first network device to a second network device via a first path;
sending first test data via the first path at predetermined intervals;
receiving at least a portion of the first test data back from the second network device;
determining, using the received portion of the first test data, whether at least one performance parameter associated with the first path meets a threshold;
sending a first notification to a customer associated with the first path in response to determining that the at least one performance parameter does not meet the threshold, the notification indicating that the first path is unavailable;
determining, using the received portion of the first test data, a plurality of performance parameters; and
sending a second notification to the customer in response to determining that at least one of the determined performance parameters does not meet a required performance parameter.

18. A method, comprising:
routing data from a first network device to a second network device via a first path;
sending first test data via the first path at predetermined intervals;
receiving at least a portion of the first test data back from the second network device;
determining, using the received portion of the first test data, whether at least one performance parameter associated with the first path meets a threshold;
sending a first notification to a customer associated with the first path in response to determining that the at least one performance parameter does not meet the threshold, the notification indicating that the first path is unavailable; and
identifying a second path in which the at least one performance parameter is less than the determined at least one performance parameter associated with the first path.

19. The method of claim 18, further comprising:
at least one of:
sending a second notification to the customer, the second notification indicating that a higher performance path is available for routing the customer's data, or
automatically switching routing of the customer's data to the second path.

* * * * *